Nov. 5, 1968     M. F. STANLEY     3,408,960
POWERED VARIEGATOR FOR FROZEN COMESTIBLE MANUFACTURE
Filed June 12, 1967
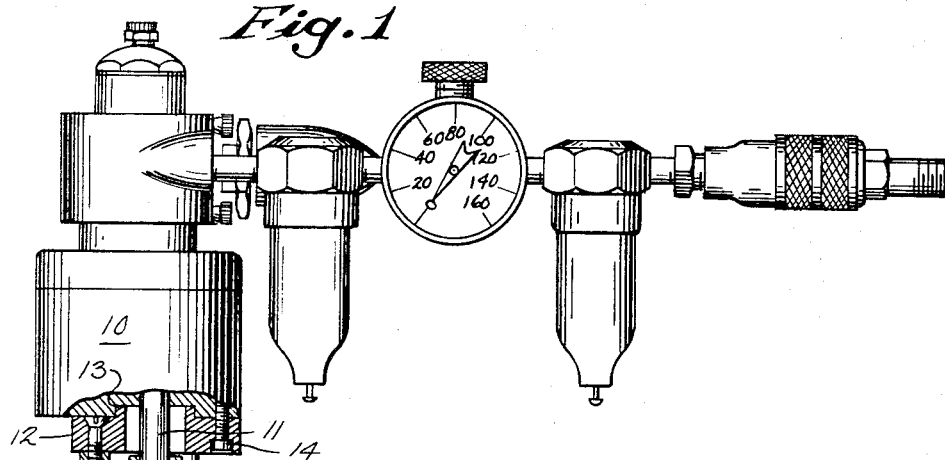
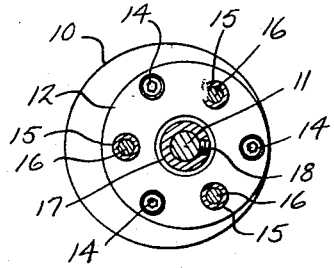
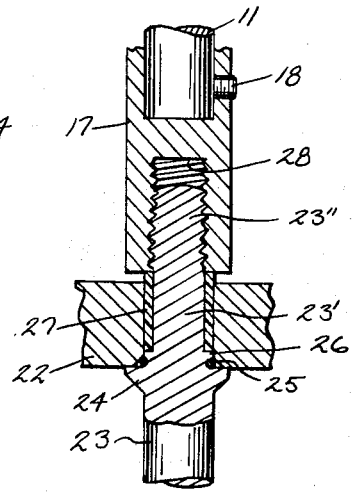
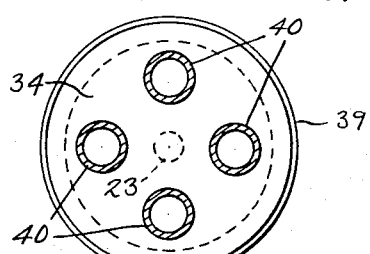
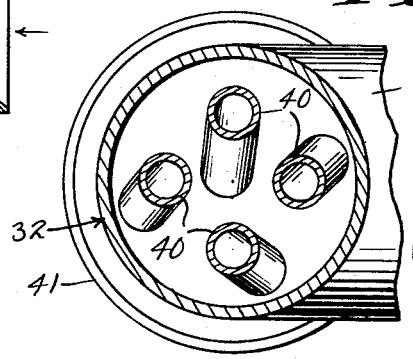
INVENTOR
MORRIS F STANLEY
BY Morsell & Morsell
ATTORNEYS United States Patent Office 3,408,960
Patented Nov. 5, 1968

3,408,960
POWERED VARIEGATOR FOR FROZEN
COMESTIBLE MANUFACTURE
Morris F. Stanley, Oconomowoc, Wis., assignor to Ho-Maid Products Co., Milwaukee, Wis., a corporation of Wisconsin
Filed June 12, 1967, Ser. No. 645,378
7 Claims. (Cl. 107—1)

ABSTRACT OF THE DISCLOSURE

For the manufacture of variegated frozen comestibles such as ice cream and the like, a mechanism is provided which will introduce into a moving mass of semi-frozen ice cream or the like continuous charges or streams of a contrasting fluent flavoring or other comestible in a manner so that the final product is rippled or variegated according to the intended uniform pattern and in a manner so that the variegating material which is thus introduced will not settle or gravitate to the bottom or sides of the container for the final product. The variegating apparatus includes a driven apertured spinner from which depend a plurality of dispersing tubes which are outwardly, downwardly diverging and differing one from another in respect to angularity and length. Also, the variegating apparatus includes fittings, etc. which satisfy all of the prescribed sanitary requirements and which will prevent "backup" of any of the material progressing through the apparatus.

Background of the invention

*Field of the invention:* The present invention pertains to a powered variegator for frozen comestibles such as ice cream and the like which insures a final product which will have and maintain the desired rippled pattern and which is well adapted for installation in conventional ice cream production system for high speed operation.

*Description of the prior art:* As far as applicant is aware, there is nothing presently available which is similar to his invention in respect to its design and ability to maintain in the finished product rippled formations according to the intended uniform pattern. Prior Patent No. 3,129,673 does not meet all of these requirements and is devoid of moving and power driven parts which are essential in the present invention. Patent Nos. 1,949,772 and 2,646,757 lack unique structural features of the present invention, and the same is true of Patents Nos. 2,479,261, 2,347,083, 2,527,273, 2,669,946, 2,774,314, 2,689,537 and 2,722,177, all of which lack the arrangement of applicant's syrup-dispersing tubes and structural features relating to fittings and joints.

Summary of the invention

The present invention provides a powered variegator for frozen comestible manufacture having a rotating spinner which can be driven at different speeds and from which depend eccentrically arranged tubes for introducing into the main body of the moving mass of semifrozen comestibles, such as ice cream, continuous streams of a contrasting fluent flavoring or other comestible in a manner so that a highly effective rippled effect is obtained in the final product, which will remain therein according to the intended pattern.

A still further object of the invention is to provide a synthetic bushing which receives the upper extension of the main shaft, thereby eliminating metal-to-metal contact and insuring a tight seal.

Another object of the present invention is to provide a frozen comestible manufacturing apparatus in which there are no exposed threads in the connections between the various components, eliminating the possibility of the dairy products coming into contact therewith, thereby satisfying sanitary code requirements.

Another feature of the present invention is the novel arrangement and mounting of the tubes to deliver into the main body of the semi-frozen comestible the contrasting flavoring material, said delivery tubes being angled outwardly and downwardly to facilitate and enhance the proper delivery of the contrasting fluent comestible.

Still further objects of the present invention are to provide a powered variegator for frozen comestible manufacture which is relatively simple in design and construction, is rapid and reliable in operation and which is otherwise particularly well suited for the purposes described.

Brief description of the drawing

In the drawing, wherein the same reference characters designate the same or similar parts in all of the views:

FIG. 1 is a side view of the improved powered variegator for frozen comestible manufacture, with part broken away and shown in vertical section;

FIG. 2 is a horizontal sectional view taken approximately along the line 2—2 of FIG. 1;

FIG. 3 is an enlarged fragmentary detail sectional view showing the coupling between the motor shaft and the main variegator shaft, including a bushing surrounding an extended portion of the main shaft within a connecting cap which eliminates metal-to-metal contact;

FIG. 4 is an enlarged transverse sectional view taken on line 4—4 of FIG. 1; and FIG. 5 is an enlarged transverse sectional view taken on line 5—5 of FIG. 1.

Description of the preferred embodiments

Referring now more particularly to FIG. 1 of the drawing, the numeral 10 designates an air motor, and extending thereabove, and also extending angularly therefrom, are conventional elements of a frozen comestible ice cream variegating apparatus including strainer, pressure regulator, oiler, etc., forming no part of the present invention. The speed of said motor can be controlled and varied by conventional means.

The motor has a driven, off-center motor shaft 11 which extends through a recess therefor in a motor coupling disc 12 which, because of the off-center disposition of the motor shaft 11, is eccentrically disposed with respect to the base of the motor 10 and is formed with an annular reduced portion 13 which extends into an off-center recess therefor in the base of the motor 10. The motor coupling disc 12 is secured to the base of the motor by threaded bolts 14. There are also depending from the motor coupling disc 12, spacedly around the outer periphery of the base thereof, a plurality of spacer rods 15, the latter being held by the disc 12 by concealed screws 16 which extend into threaded bores therefor in the upper ends of the spacer rods 15. The numeral 17 designates a depending cylindrical coupling having a bore in its upper end into which the lower end portion of the motor shaft 11 extends, being secured thereto by means of a set screw 18 so that the coupling 17 will be driven by the motor shaft 11.

A first T-fitting is designated by the numeral 19 and the upper end portion of the same is externally threaded as at 20 to receive an internally threaded outer cap 21 which also encloses an inner cap 22 at the upper end of the main shaft 23 which extends axially of the main extent of the T-fitting 19. The inner cap 22 is formed with a central bore to receive a reduced portion 23' of the shaft 23 (see FIG. 3) and the shaft 23 adjacent the base of the inner cap 22, so as to cover the lower portion of the bore therein, is formed with an annular flange 24 in the annular shoulder of which is seated a resilient O-ring 25 which impinges against an annular shoulder 26 formed on the shaft 23 within the bore in the inner cap 22. Surrounding the reduced portion 23' of the shaft 23 within the bore of the inner cap 22 is a cylindrical bushing 27, preferably formed of nylon, Teflon, or any other suitable synthetic material. By having the reduced portion 23' of the shaft enclosed by the synthetic bushing 27, metal-to-metal contact is eliminated as the shaft 23 is driven, as will hereinafter appear. The bushing 27 extends slightly above the upper face of the inner cap 22 and there is seated thereon the lower end portion of the coupling 17, the latter being formed with an internally threaded bore 28 to receive the threaded portion 23" of the shaft 23, whereby the coupling 17 serves to connect the main shaft 23 with the motor shaft 11.

At this point it might be stated incidentally that equipment used in the dairy field should not be formed with distinct provisions for receiving tools. However, in order to screw the shaft 23 into its associated elements the same may be formed with a transverse bore 29 into which a pointed instrument such as an ice pick could be inserted.

It was before noted that spacer rods 15 depend from the coupling disc 12 in formation around the coupling 17. As is best shown in FIG. 1, the lower end portions of these spacer rods 15 are bored and internally threaded to receive concealed screws 30 whose lower end portions threadably extend into tapped openings therefor in the inner cap 22. Thus, the inner cap 22 is spaced below the coupling disc 12 by the spacer rods 15, but is anchored thereto against turning movement, whereas the shaft 23 is turnable within the synthetic bushing 27 and is in turn anchored to the lower end of the coupling 17 which is anchored to the lower end portion of the motor shaft 11.

The first T-fitting 19 is formed with a lateral branch 31 to which a fluent flavoring introducing line (not shown) is normally connected. For manufacturing a variegated frozen comestible, such as rippled ice cream, a suitable contrasting flavoring syrup would be introduced into the T lateral 31 so as to flow downwardly in the main extent of the T around the driven shaft 23, for ultimate patterned introduction into the semi-frozen comestible, such as ice cream, which is introduced into a second T-fitting 32 by means of a supply pipe (not shown) carried by the lateral extension 33 on said second T-fitting 32. However, within the contemplation of the present invention another type of distinctively colored and flavored ice cream could be introduced into the T-fitting 19 for commingling with the ice cream or comestible introduced into the T-fitting 32, in lieu of a contrasting fluent flavoring.

A disc-like spinner 34 has a lower end portion of the driven shaft 23 threaded thereinto, as shown in FIG. 1, and the spinner is intended to be turned at a desired speed within the lower end portion of the main extent of the first T-fitting 19. The latter is slightly outwardly flared as at 35 to receive the internally shouldered and recessed portion of a union cap 36, the latter having, below its recessed and shouldered portion, threads 37 to engage complementary threads on the upper end portion of the second T-fitting 32, whereby the upper end portion of the second T-fitting is connected to and in communication with the lower end portion of the first T-fitting 19. It should furthermore be observed that the meeting portions of said T-fittings are angled as at 38. The spinner 34 is formed with an annular groove in which is seated a suitable O-ring 39 which will sealingly bear against the inner surface of the lower end of the T-fitting 19 and prevent leakage or back-up of the semi-frozen comestible introduced into the T-fitting 32. As is best shown in FIG. 4, the spinner is arranged with a series of arcuately spaced apart bores in which are secured the upper end portions of fluent flavoring dispersing tubes 40. There may be any desired number of said tubes 40, but in the illustrated embodiment four of such tubes have been shown which extend from the spinner 34 downwardly through the main body of the second T-fitting 32, with their discharge ends arranged to open into any suitable conduit 41 in the line carried by the lower end portion of the second T-fitting 32. The arrangement of said tubes 40 as to their angularity, length differences and eccentricity in arrangement and disposition is important in facilitating the desired distribution of the fluent comestible originally introduced into the first T-fitting 19. It will, of course, be apparent that the tubes 40 open at their upper ends through the top surface of the spinner 34 into the lower portion of the first T-fitting 19, whereby the fluent comestible in said T-fitting is caused to enter into the upper ends of the tubes 40 as the spinner is being turned by the shaft 23. Likewise, the discharge of the fluent contrasting comestible is introduced from the lower open ends of the tubes 40 into the semi-frozen ice cream or the like which is forced downwardly in the main extent of the T-fitting 32, and the arrangement of the tubes and their rotation by means of the spinner is effective in introducing the contrasting comestible or flavoring into the main body in a desired pattern and configuration which will remain set and not ultimately gravitate toward the bottom and sides of the container in which the comestible is packed. As the descending ice cream mass from the second T-fitting moves completely around the tubes 40, the flavoring or constrasting material in the tubes 40, being discharged from the lower ends of the same, is injected into the interior of the moving ice cream mass in the form of a plurality of spaced ribbons or streams of a constrasting character. The variegated ice cream column continues downwardly through the lower open end of the second T-fitting and is discharged into a suitable container therebelow.

Great advantages flow from having the eccentrically arranged dispersing tubes 40 depend into the lower chamber from a rotating spinner whose turning speed can be varied. For instance, when the spinner is driven at a certain speed the tubes 40 will introduce into the progressing comestible main body streams or ribbons of the contrasting material of a desired cross-section. By speeding up the drive for the spinner or by retarding it the cross-sections of the introduced ribbons can be widened or narrowed, but the same spacing arrangement between adjacent ribbons will prevail. Also, it will be appreciated that the ribbon-introducing unit, which includes the spinner 34 and the dispersing tubes 40, may be replaced by one in which the tubes have larger or smaller diameters and are differently disposed relative to one another. In any event, due to the fact that the main body of the comestible introduced into the lower fitting 32 and discharged into the conduit 41 therebelow completely encloses the discharge ends of the tubes 40, the ribbons or streams of the contrasting comestible are maintained within the main body of the comestible. In practice, the final product may be discharged from the conduit 41 into a square one-half gallon package, by way of example, and the arrangement is such that the material making up the contrasting ribbons or streams will not gravitate toward the sides, bottom or lower corners of the container to mar the design effect of the final product.

From the foregoing description it will be seen that pursuant to the present invention a powered variegator for frozen comestible manufacture is provided wherein the streams or ribbons of the contrasting material are continuously introduced into the main body of the ice cream or comestible pursuant to a predetermined pattern, and will remain in the final product permanently in this condition. All of the joints in the apparatus are extremely tight and eliminate any conditions which would be at variance with the sanitary codes. The powered variegator can be readily installed in standard ice cream production systems, is simple and reliable in operation, and is otherwise well adapted for the purposes set forth.

What I claim is:

1. An apparatus for producing a variegated comestible, comprising: an upper chamber and a lower chamber in axial alignment, the lower chamber having a side inlet through which a basic fluent comestible is introduced, the upper chamber having a side inlet through which a contrasting fluent comestible is introduced and also having sealing means at its upper end, the lower chamber having a lower outlet for discharging the composite moving stream of fluent material; an apertured driven spinner separating the two chambers and having a dispersing tube depending from each aperture thereof into the lower chamber, said tubes diverging outwardly downwardly from one another within the lower chamber and differing one from another in respect to angularity and length; and a drive shaft connected at its lower end to the spinner to move it and extending axially of the upper chamber through said upper end sealing means.

2. The apparatus of claim 1 wherein the drive shaft turns the spinner and is associated with a motor which can turn the spinner at varying speeds.

3. The apparatus defined in claim 1 wherein that portion of the drive shaft which extends through said upper end sealing means is enclosed by a synthetic bushing.

4. The apparatus defined in claim 1 wherein said upper end sealing means is devoid of exposed screw threads.

5. The apparatus defined in claim 1 wherein the spinner and depending tubes are removable from the apparatus as a unit for selective replacement.

6. The apparatus defined in claim 1 wherein the upper and lower chambers are axially aligned T-fittings.

7. The apparatus defined in claim 6 wherein a union cap sealingly, detachably connects the abutting ends of said T-fittings.

References Cited

UNITED STATES PATENTS

| | | | |
|---|---|---|---|
| 1,949,772 | 3/1934 | Allen | 107—47 |
| 2,313,060 | 3/1943 | Friedman | 107—1 |
| 2,334,052 | 11/1943 | Wedin | 107—1 |
| 2,347,083 | 4/1944 | Connellee et al. | 107—1 XR |
| 2,389,084 | 11/1945 | Routh | 107—1 |
| 2,479,261 | 8/1949 | Reetz | 264—75 |
| 2,527,273 | 10/1950 | Marks | 107—1 |
| 2,646,757 | 7/1953 | Hackmann | 107—1 |
| 2,669,946 | 2/1954 | Peyton | 107—1 |
| 2,689,537 | 9/1954 | Peyton | 107—54 |
| 2,722,177 | 11/1955 | Routh | 107—1 |
| 2,774,314 | 12/1956 | Moser | 107—1 |
| 3,129,673 | 4/1964 | Stanley et al. | 107—1 |

WALTER A. SCHEEL, *Primary Examiner.*

A. O. HENDERSON, *Assistant Examiner.*